United States Patent
Minoux et al.

(10) Patent No.: US 9,821,298 B2
(45) Date of Patent: Nov. 21, 2017

(54) PROCESS FOR PREPARING A HYDROCONVERSION CATALYST, CATALYST THUS OBTAINED AND USE THEREOF IN A HYDROCONVERSION PROCESS

(71) Applicant: TOTAL RAFFINAGE FRANCE, Courbevoie (FR)

(72) Inventors: Delphine Minoux, Nivelles (BE); Nadiya Danilina, Uccle (BE)

(73) Assignee: TOTAL RAFFINAGE FRANCE, Courbevoie (FR)

( * ) Notice: Subject to any disclaimer, the term of this patent is extended or adjusted under 35 U.S.C. 154(b) by 298 days.

(21) Appl. No.: 14/241,667

(22) PCT Filed: Oct. 23, 2012

(86) PCT No.: PCT/EP2012/070940
§ 371 (c)(1),
(2) Date: Feb. 27, 2014

(87) PCT Pub. No.: WO2013/060666
PCT Pub. Date: May 2, 2013

(65) Prior Publication Data
US 2014/0339134 A1  Nov. 20, 2014

(30) Foreign Application Priority Data

Oct. 24, 2011  (FR) ...................................... 11 59616
Dec. 29, 2011  (FR) ...................................... 11 62521

(51) Int. Cl.
*B01J 29/06*  (2006.01)
*B01J 29/16*  (2006.01)
(Continued)

(52) U.S. Cl.
CPC ............. *B01J 29/166* (2013.01); *B01J 29/10* (2013.01); *B01J 29/106* (2013.01); *B01J 29/14* (2013.01);
(Continued)

(58) Field of Classification Search
CPC .............. B01J 2229/186; B01J 2229/36; B01J 2229/37; B01J 2229/40; B01J 2229/42;
(Continued)

(56) References Cited

U.S. PATENT DOCUMENTS 3,293,192 A  12/1966 Maher et al.
3,506,400 A  4/1970 Eberly et al.
(Continued)

FOREIGN PATENT DOCUMENTS

EP  0 082 211 A1  6/1983
EP  0 519 573 A1  12/1992
(Continued)

OTHER PUBLICATIONS

A. Jos Van Dillen, et al., "Synthesis of supported catalysts by impregnation and drying using aqueous chelated metal complexes", Journal of Catalysts, 2003, pp. 257-264, vol. 216, No. 1-2.
(Continued)

*Primary Examiner* — Renee Robinson
*Assistant Examiner* — Derek Mueller
(74) *Attorney, Agent, or Firm* — Sughrue Mion, PLLC

(57) ABSTRACT

A process for preparing a hydroconversion catalyst comprising the steps of:
preparing a modified zeolite of the FAU framework type, whose intracrystalline structure presents at least one network of micropores, at least one network of small mesopores with a mean diameter of 2 to 5 nm and at least one network of large mesopores with a mean diameter of 10 to 50 nm; these various networks being interconnected;

(Continued)

mixing the zeolite with a binder, shaping the mixture, and then calcining;

impregnating the shaped zeolite with at least one compound of a catalytic metal chosen from compounds of a metal from group VIII and/or from group VIB, in acidic medium, provided that at least one compound of a catalytic metal is soluble within said acidic medium and that the acid acts as a complexing or chelating agent for at least one compound of a catalytic metal.

19 Claims, 3 Drawing Sheets

(51) Int. Cl.
| | |
|---|---|
| *B01J 29/10* | (2006.01) |
| *B01J 29/14* | (2006.01) |
| *C10G 49/08* | (2006.01) |
| *B01J 35/00* | (2006.01) |
| *B01J 35/10* | (2006.01) |
| *C10G 47/18* | (2006.01) |
| *C10G 47/20* | (2006.01) |
| *B01J 37/00* | (2006.01) |
| *B01J 37/28* | (2006.01) |

(52) U.S. Cl.
CPC .............. *B01J 29/146* (2013.01); *B01J 29/16* (2013.01); *B01J 35/002* (2013.01); *B01J 35/1057* (2013.01); *B01J 35/1061* (2013.01); *B01J 35/1095* (2013.01); *C10G 47/18* (2013.01); *C10G 47/20* (2013.01); *C10G 49/08* (2013.01); *B01J 37/0018* (2013.01); *B01J 37/28* (2013.01); *B01J 2229/186* (2013.01); *B01J 2229/36* (2013.01); *B01J 2229/37* (2013.01); *B01J 2229/40* (2013.01); *B01J 2229/42* (2013.01)

(58) Field of Classification Search
CPC . B01J 29/10; B01J 29/106; B01J 29/14; B01J 29/146; B01J 29/16; B01J 29/166; B01J 35/002; B01J 35/1057; B01J 35/1061; B01J 35/1095; B01J 37/0018; B01J 37/28; C10G 47/18; C10G 47/20; C10G 49/08

See application file for complete search history.

(56) References Cited

U.S. PATENT DOCUMENTS

| | | | |
|---|---|---|---|
| 4,093,560 | A | 6/1978 | Kerr et al. |
| 5,069,890 | A | 12/1991 | Dai et al. |
| 5,601,798 | A | 2/1997 | Cooper et al. |
| 2005/0197249 | A1 | 9/2005 | Creyghton et al. |
| 2010/0279856 | A1 | 11/2010 | Dykstra et al. |
| 2012/0018349 | A1 | 1/2012 | Van Donk et al. |

FOREIGN PATENT DOCUMENTS

| | | |
|---|---|---|
| EP | 0 528 494 A1 | 2/1993 |
| EP | 0 665 280 A1 | 8/1995 |
| WO | 2005/084779 A1 | 9/2005 |
| WO | 2010/072976 A1 | 7/2010 |
| WO | 2011/069150 A2 | 6/2011 |

OTHER PUBLICATIONS

International Search Report (PCT/ISA/210) in corresponding PCT/EP2012/070940.

Donk et al., Generation, Characterization, and Impact of Mesopores in Zeolite Catalysts, Catalysts Reviews 45 (2003), pp. 297-319.

Janssen et al., Three-Dimensional Transmission Electron Microscopic Observations of Mesopores in Dealuminated Zeolite Y, Angew. Chem. Int. Ed. 40 (2001), pp. 1102-1104.

Ogura et al., Formation of Uniform Mesopores in ZSM-5 Zeolite through Treatment in Alkaline Solution, Chem. Lett. (2000), pp. 882-883.

Ogura et al., Alkali-treatment technique—new method for modifcation of structural and acid-catalytic properties of ZSM-5 zeolites, Appl. Catal. A Gen. 219 (2001), pp. 33-43.

Groen et al., On the inroduction of intracrystalline mesoporosity in zeolites upon desilication in alakline medium, Microporous Mesoporous Mater. 69 (2004), pp. 29-34.

Groen et al., Optimal Aluminum-Assisted Mesoporosity Development in MFI Zeolies by Desilication, J. Phys. Chem. B, 108 (2004), pp. 13062-13065.

Jong et al., Zeolite Y Crystals with Trimodal Porosity as Ideal Hydrocracking Catalysts, Angew. Chem. Int. Ed. 49 (2010), pp. 10074-10078.

Trong et al., Perspectives in catalytic applications of mesostructured materials, Applied Catalysis A: General 222 (2001), pp. 299-357.

PROCESS FOR PREPARING A HYDROCONVERSION CATALYST, CATALYST THUS OBTAINED AND USE THEREOF IN A HYDROCONVERSION PROCESS

CROSS REFERENCE TO RELATED APPLICATIONS

This application is a National Stage of International Application No. PCT/EP2012/070940, filed Oct. 23, 2012, claiming priority based on French Patent Application Nos. 11 59616, filed Oct. 24, 2011 and FR 11 62521, filed Dec. 29, 2011, the contents of all of which are incorporated herein by reference in their entirety.

The invention relates to a process for preparing a hydroconversion catalyst, for example, a hydrocracking catalyst, to the catalyst thus obtained and to the use of the catalyst thus obtained in a hydroconversion process.

The catalyst described here comprises a modified zeolite of the FAU framework type and may be used in many hydroconversion processes, in particular, in the hydrocracking process.

PRIOR ART

Zeolites are important catalytic materials and largely used in acid catalyzed reactions like cracking (e.g. hydrocracking, FCC, olefin cracking), isomerization reactions (e.g. of paraffins and olefins) and more recently, methanol conversion technologies (e.g. MTO, MTP, MTG). For all these reactions, the zeolite is the heart of the catalyst, rendering high catalytic activity, high stability, and last but not least high product selectivity, induced by the microporous zeolite structure. Notwithstanding the positive effect of the presence of micropores with respect to shape selectivity, the micropores may also have a negative impact, which is often illustrated by the limited access of molecules to the zeolite crystals, or unwanted adsorption effects of reactants and/or products during the catalytic reaction. These steric constraints decrease the accessibility of the zeolite micropore volume during the catalytic reaction, and it can be stated that the zeolite crystals are not always being used effectively.

One of the important issues in the development of new zeolite catalysts is the guarantee of sufficient accessibility of the active sites for reactant and/or product molecules, thereby maximizing the effectiveness of the catalyst. The straightforward solution to minimize diffusion limitation would be the reduction of the intracrystalline diffusion pathlength. One possibility is to decrease the zeolite crystal size. Another strategy, to obtain materials with sufficient accessibility is the creation of a secondary pore system consisting of mesopores (2-50 nm) inside the microporous zeolite crystals. Traditionally, mesopores are introduced into zeolites and zeolite-like crystals by dealumination, using hydrothermal treatment such as steaming [U.S. Pat. No. 3,293,192, U.S. Pat. No. 3,506,400, and U.S. Pat. No. 5,069,890], and acid leaching techniques [U.S. Pat. No. 3,506,400, U.S. Pat. No. 4,093,560, and U.S. Pat. No. 5,601,798]. Alternatively, chemical treatments, with for example EDTA [U.S. Pat. No. 3,506,400 and U.S. Pat. No. 4,093,560] or $(NH_4)_2SiF_6$ [EP0082211], have been proposed as well. A more detailed literature review on the generation of mesopores in zeolites by various methods, was presented by van Donk et al. [S. van Donk et al., *Catalysis Reviews* 45 (2003) 297].

Despite considerable developments over the last years in the domains of the synthesis, characterization and comprehension of the formation mechanisms of these structured mesoporous materials, their effective application in industry is still highly limited because of their high cost, which is partially related to the high cost of the organic template. Therefore, from a cost perspective, the classical hydrothermal and acid leaching techniques remain highly attractive, which explains why they are largely used today in industry. However, the introduction of mesopores by these ways is not easily controlled and often materials are obtained with a random and non-optimized mesoporosity. In a paper by Janssen et al. [A. H. Janssen et al., Angew. Chem. Int. Ed. 40 (2001) 1102], it was demonstrated using three-dimensional electron microscopy that a large part of the mesopores in a commercially available steamed and acid-leached zeolite Y (CBV780, Zeolyst Int.) were cavities, not optimally connected to the outer surface of the zeolite crystal. Obviously, for catalysis, a system of interconnected cylindrical mesopores is expected to enhance the accessibility for reactants and the diffusion of reaction products much more than mesoporous cavities inside the crystal.

In recent years, as an alternative to the classical hydrothermal and acid leaching of the as-synthesized zeolite material, another approach for the formation of mesopores has been proposed [M. Ogura et al., Chem. Lett. (2000) 82; M. Ogura, Appl. Catal. A Gen. 219 (2001) 33; J. C. Groen et al., Microporous Mesoporous Mater. 69 (2004) 29; J. C. Groen, et al., J. Phys. Chem. B, 108 (2004) 13062]. This alternative method is based on the careful desilication of the as-synthesized zeolite by a treatment in an alkaline medium. This technique was first explored in the late 1980's for studying dissolution phenomena and structural changes in zeolite Y and ZSM-5. Furthermore, two patents were assigned to Shell on the modification of ultra-stable and very ultra-stable Y-zeolites with a Si/Al ratio between 2 and 12.5 at/at [EP0528494] and their application in a hydrogenation process [EP0519573].

Recently, the Applicant has disclosed in the patent application WO 2010/072976, a modified zeolite Y prepared by careful desilication of a dealuminated faujasite, resulting in a material which had a unique trimodal system of intracrystalline and interconnected pores. This zeolite showed an improved performance in several hydrocracking reactions, being more selective to middle distillates and suppressing overcracking.

To prepare an industrially relevant hydroconversion catalyst, the zeolite described in WO2010/072976 has been extruded with a binder and impregnated with metals. K. P. de Jong et al. in *Angewandte Chemie, International Edition* 2010, (49), pp. 10074-10078, describes the preparation of the so-called shaped catalyst and its catalytic performance in hydrocracking of VGO. The described catalytic results show an improvement in the yield of middle distillates over the shaped catalyst containing the zeolite with trimodal porosity. However, the activity of the invented catalyst was low compared to the shaped zeolite without the trimodal porosity and to a commercial hydrocracking catalyst. This low activity may be attributed to the crystallinity and porosity, especially trimodal porosity, that might have been modified during the process of preparation of the final catalysts.

Generally, there are two characteristics that might be responsible for the low catalytic activity of zeolite-based catalysts—the low microporous volume and crystallinity (microcrystallinity). This microcrystallinity is strongly affected during the formulation of the final catalyst starting from the mesoporous zeolite component. The improvement or preserving of catalyst properties, such as microcrystallinity and trimodal porosity, by optimizing the metal impregnation procedure and the resulting improvement of the activity in hydrocracking are sought.

Several patents describe industrial hydrocracking catalysts based on mesoporous zeolites obtained by base treatment [EP0528494, EP0519573]. However, no accent is put on microcrystallinity of the final product, being defined as a combination of long-range crystallinity and microporosity.

The loss of microcrystallinity of a mesoporous zeolite during post-treatment and formulation of final catalyst is mentioned in prior art [D. Trong On et al., Applied Catalysis A: General 222 (2001) 299-357]. However, the influence of metal impregnation step is not described.

US2005/0197249 (WO2005/084779) to Shell Oil Company, discloses the use of citric or malic acid for the preparation of a hydrocracking catalyst. In this document, the starting material is a conventional microporous zeolite which is mixed with a refractory inorganic oxide binder plus water and acid to obtain a shaped catalyst precursor. Then, citric or malic acid is added along with nickel nitrate and ammonium metatungstate at some stage in the impregnation step of said shaped catalyst precursor. However, the effect of acid addition on the properties of the final catalyst is not discussed.

US2010/0279856 discloses multi-metallic hydroconversion catalyst precursors obtained by precipitating Ni—Mo—W salts using maleic acid. No zeolitic material is employed therein.

K. P. de Jong et al. in Angewandte Chemie, International Edition 2010, (49), pp. 10074-10078, disclose a method of preparation of a shaped catalyst based on zeolite Y that is bearing trimodal porosity, the latter being impregnated with nickel and molybdenum salts in the presence of ethylene diamine.

Albeit metal impregnation procedure is known for different catalytic materials, no prediction regarding modification of activity can be made from one catalyst to another since their chemical composition, their crystallinity and/or their morphology may differ.

DESCRIPTION OF THE INVENTION

The Applicant has now discovered a process for preparing an industrial hydroconversion catalyst comprising zeolite of the FAU framework type with trimodal porosity showing high activity.

According to a first aspect, a subject of the invention is a process for preparing a hydroconversion catalyst based on a modified zeolite of FAU framework type with preserved crystallinity as well as interconnected trimodal porosity, comprising the steps of:
A—preparation of a modified zeolite of a FAU framework type, whose intracrystalline structure presents at least one network of micropores, at least one network of small mesopores with a mean diameter of 2 to 5 nm and at least one network of large mesopores with a mean diameter of 10 to 50 nm; these various networks being interconnected;
B—mixing the zeolite with a binder, shaping the mixture, and then calcining;
C—impregnation of the shaped zeolite with at least one compound of a catalytic metal chosen from compounds of a metal from group VIIIB and/or from group VIB, in acidic medium, provided that at least one compound of a catalytic metal is soluble within said acidic medium and that the acid acts as a complexing or chelating agent for at least one compound of a catalytic metal.

By "preserved crystallinity", the applicant means crystallinity (or microcrystallinity) that is not substantially affected by different chemical or physical treatments. In other words, the loss of crystallinity and microporosity after chemical or physical treatment, when compared to starting material, is low.

The catalyst prepared in step A) can also contain mesopores in the size range of 5-10 nm.

Advantageously, the modified zeolite of a FAU framework type is a modified zeolite Y.

The parent zeolite of the FAU framework type used as starting material in the process described above will preferably have a Si/Al ratio of greater than or equal to 12. Such a zeolite is advantageously partially dealuminated and vapour-treated. An example of such a zeolite is a commercially available zeolite Y (CBV760, Zeolyst Int.).

Such a zeolite may be obtained, for example, by applying to a zeolite of the FAU framework type at least one dealumination treatment, in particular a partial dealumination treatment, for example, with at least one acid and/or water vapour.

More generally, step C) consists in the introduction into the shaped catalyst from step B) of at least one catalytic metal chosen from group VIIIB and/or from group VIB with at least one compound of a catalytic metal chosen from group VIIIB and/or from group VIB, in acidic medium, provided the at least one compound of catalytic metal is at least partly soluble within said acidic medium and that the acid acts as a complexing or chelating agent for at least one compound of a catalytic metal, said introduction being advantageously followed by calcination.

It may be important to chose the acidic medium such that the compound of a catalytic metal is at least partly soluble within this acidic medium. In particular, the amount of compound of a catalytic metal solubilised in the acidic medium should be sufficient to permit impregnation of the desired quantity of catalytic metal on the shaped zeolite. A complete precipitation of the compound of a catalytic metal in the acidic medium would not permit introduction of the catalytic metal into the shaped zeolite, in particular when introduction is performed by impregnation.

Group VIE corresponds to group 6 of IUPAC periodic table of the elements (version of Jun. 22, 2007) and comprises Cr, Mo and W. Group VIIIB corresponds to groups 8, 9 and 10 of IUPAC periodic table of the elements (version of Jun. 22, 2007) and comprises Fe, Ru, Os, Co, Rh, Ir, Ni, Pd, Pt. Doping agents such as B, P, Si, Zr and Ti can be also added.

By acidic medium, the applicants mean a solution having a pH from 1 to 7 (being excluded).

The invention also relates to the catalyst that may be obtained via the process described above, namely, a hydroconversion catalyst consisting of a shaped mixture comprising:
a modified zeolite of the FAU framework type, whose intra-crystalline structure presents at least one network of micropores, at least one network of small mesopores with a mean diameter of 2 to 5 nm and at least one network of large mesopores with a mean diameter of 10 to 50 nm, these various networks being interconnected;
at least one binder;
at least one compound of a catalytic metal chosen from metals of group VIIIB and/or of group VIB.

The hydroconversion catalyst consisting of a shaped mixture of the invention may also be referred to as a shaped catalyst containing a modified zeolite of the FAU framework type, at least one binder and at least one compound of a catalytic metal with the above mentioned characteristics.

This final shaped catalyst is ready to be used industrially in a reactor.

The term "shaped" refers to a catalyst that is no longer in powder form, but may be in the form of beads, pellets or extrudates, extrudates being preferred.

The binder may be selected among alumina, silica, silica-alumina, magnesia and titania or their combinations.

The metal may be selected among nickel, cobalt, molybdenum and tungsten.

A modified zeolite of the FAU framework type of the shaped zeolite (i.e containing a modified zeolite of the FAU framework type having a trimodal intracrystalline porosity and a binder) obtained after step B), also referred to "extruded material", is preferably exhibiting the following characteristics:
 crystallinity of 50-70%, preferably from 55% to 65%;
 external surface area of 300-400 m$^2$/g;
 volume of micropores of 0.05-0.20 ml/g;
 mesopores volume of 0.20-0.50 ml/g;
 total pore volume of 0.40-0.90 ml/g;

The final catalyst according to the invention, obtained after step C), advantageously has the following characteristics:
 crystallinity of 60 to 130% of the crystallinity of the extruded material (step B)) before impregnation with metal compounds, in particular, from 70 to 120%,
 microporosity, expressed by the volume of micropores, being 60 to 130% of the microporous volume of the extruded material (step B)) before impregnation with metal compounds, in particular, from 70 to 120%,
 pore size distribution corresponding to the one of the extruded material (step B)) before impregnation with metal compounds,
 specific surface area (BET) of 60 to 130% of the specific surface area of the extruded material (step B)) before impregnation with metal compounds, in particular, from 70 to 120%,
 external surface area of 60 to 130% of the specific surface area of the extruded material (step B)) before impregnation with metal compounds, in particular, from 70 to 120%,
 total pore volume of 60 to 130% of the specific surface area of the extruded material (step B)) before impregnation with metal compounds, in particular, from 70 to 120%,
 amount of Brønsted acid sites, expressed by the molar amount of desorbed $NH_3$ per gram of catalyst, of 60 to 130% of the amount of Brønsted acid sites of the extruded material (step B)) before impregnation with metal compounds, in particular, from 65 to 120%,
 zeolite content: 5% to 90% by weight, preferably 10% to 80% by weight;
 optionally, NiO content of 1% to 10% by weight and $MoO_3$ content of 5% to 30% by weight.

The characteristics of the final catalyst from step C) according to the invention are similar (60% to 130%) to those of the shaped zeolite from step B). Especially, the microcrystallinity, represented by the crystallinity and the volume of micropores, is well preserved in the metal-impregnated catalysts from step C) compared to those from step B).

Step A)

The synthesis of the powders was performed according to the process described in WO2010072976.

Step A) of preparation of the modified zeolite of the FAU framework type may include the following steps:
 a) contacting a parent zeolite of the FAU framework type in a basic aqueous solution comprising at least one base, for example, NaOH, $NH_4OH$, KOH, sodium carbonate, sodium citrate or an tetraalkyl ammonium hydroxide, at a concentration ranging, for example, from 0.001 to 0.5 M, at room temperature, with magnetic or mechanical stirring,
 b) neutralizing the medium by addition of at least one acid, for example, at a concentration ranging from 0.005 to 2 M, at room temperature, with stirring,
 c) separating the zeolite obtained from the liquid and optionally washing it with a solvent, especially a polar solvent, for example, water,
 d) optionally drying the washed zeolite,
 e) placing the washed and optionally dried zeolite in contact with a solution containing ammonium ions, especially an aqueous solution, of $NH_4NO_3$, especially at a concentration ranging from 0.01 to 0.5 M; this step can be performed several times, for example 2 to 3 times,
 f) washing the zeolite with water,
 g) calcining the zeolite obtained, and
 h) recovering the modified zeolite of the FAU framework type.

The parent zeolite of the FAU framework type used during step a) of the process described above will preferably have an Si/Al ratio of greater than or equal to 12.

Such a zeolite may be obtained, for example, by applying to a zeolite of the FAU framework type at least one dealumination treatment, in particular a partial dealumination treatment, for example, with at least one acid and/or water vapour treatment. These treatments may lead to (i) reducing of the acidity of the material, (ii) increase, albeit slight, in the mesoporosity of the initial material, which is theoretically purely microporous.

In step a), the aqueous solution/zeolite weight ratio may range from 20 to 100, especially from 30 to 80, in particular from 40 to 60, or may even be about 50. The base concentration of the solution of step a) may range from 0.001 to 0.5 M, especially from 0.005 to 0.2, in particular from 0.01 to 0.1, or may even be about 0.05 M.

In step a), the placing in contact with a basic solution may last from 5 to 120 minutes, especially, from 10 to 60 minutes and in particular, from 15 to 30 minutes.

Advantageously, this step of placing in contact (suspending) the zeolite with a basic solution can be carried out at room temperature, therefore, does not require heating. For the purposes of the present invention, the term "room temperature" means a temperature ranging from 10 to 55° C. and in particular, from 15 to 35° C.

During this placing in contact, the suspension may be stirred, especially, by magnetic or mechanical stirring.

The process for preparing the modified zeolite of the FAU framework type may also include, after the step a), a step b) of neutralizing the solution before the first filtration. The purpose of the neutralization is to stop the desilication process and to prevent the undesired destruction of the material that can result in extensive loss of crystalline structure of the zeolite, loss of microporosity and induce a decrease in the intrinsic activity of the material.

The neutralization step may be performed by washing with water or with any type of acid, for example, sulphuric, nitric, acetic, citric, phosphoric acid, or mixture of those, in particular, under industrial conditions, on a large amount of material.

The process may also include, after the step b), a step c) of separating of the modified zeolite of the FAU framework type from the neutralized solution, followed by a washing step.

The modified zeolite of the FAU framework type may then be dried (step d). The drying step may be performed at a temperature greater than or equal to 70° C., especially, greater than or equal to 75° C., or even greater than or equal to 80° C. It may range from one to 36 hours, especially, from 1 to 24 hours and in particular, from 1 to 10 hours.

The drying step may last until the weight of the product no longer changes, in particular, when the difference between the weight of the product at a time t and the weight of this product after two hours of heating changes by less than 0.1% by weight relative to the total weight of the product.

The drying may be performed in air or under an inert atmosphere.

In step e), the solution containing ammonium ions/zeolite weight ratio may range from 3 to 75, especially, from 3 to 50, in particular, from 4 to 30.

The ammonium salt concentration, for example $NH_4NO_3$ concentration of the solution of step e) may range from 0.01 to 0.5, especially, from 0.05 to 0.4, in particular, from 0.1 to 0.3, or may even be about 0.2 M.

Advantageously, step e) can be carried out at room temperature, therefore, does not require heating.

Step e) of placing in contact with the solution containing ammonium ions may last from 1 to 24 hours, especially, from 1 to 12 hours, in particular, from 1 to 8 hours, or even about 1-5 hours. This step may be performed one to three times.

The calcination step g) may be performed at a temperature of greater than or equal to 400° C., especially, greater than or equal to 450° C., or even greater than or equal to 500° C. The heating may last from 1 to 8 hours, in particular, from 1 to 6 hours, or even from 1 to 5 hours.

The heating may comprise a temperature rise of 0.5 to 2° C./minute and especially 1° C./minute.

The heating may be performed in air or under an inert atmosphere.

Then, the catalyst essentially consisting of a modified zeolite of the FAU framework type is recovered (step h)).

By implementing step A), a modified zeolite of the FAU framework type catalyst is obtained exhibiting a trimodal intracrystalline porosity, represented by at least one network of micropores, at least one network of small mesopores with a mean diameter of 2 to 5 nm and at least one network of large mesopores with a mean diameter of 10 to 50 nm, these various networks being interconnected.

The modified zeolite of the FAU framework type of the present invention thus has trimodal intracrystalline porosity, i.e. three networks of pores of different mean diameters within each crystal.

More specifically, a modified zeolite of the FAU framework type may be obtained with a micropore volume that is 30%, especially, 40%, in particular, 45%, or even 50% less than the micropore volume of the starting zeolite of the FAU framework type.

The modified zeolite of the FAU framework type may have a mesopore volume that is 30%, especially 35%, in particular 40%, or even 55% higher than the mesopore volume of the starting zeolite of the FAU framework type. In particular, the increase in mesopore volume is essentially due to the creation of small mesopores.

The crystallinity of the zeolite with trimodal porosity may be from 3% to 100%.

The modified zeolite may have an atomic Si/Al ratio of less than or equal to 25, especially, less than or equal to 24, or even less than or equal to 23, more particularly, less than or equal to 22, even more particularly, less than or equal to 21 and optionally, less than or equal to 20.5.

The atomic Si/Al ratio may also be less than or equal to 40, especially, less than or equal to 35, or even less than or equal to 30, more particularly, less than or equal to 28 and even more particularly, less than or equal to 25.

The atomic Si/Al ratio may be greater than or equal to 6, especially, greater than or equal to 8, or even greater than or equal to 10, more particularly, greater than or equal to 11 and even more particularly, greater than or equal 12.

The atomic Si/Al ratio may also be greater than or equal to 15, especially, greater than or equal to 17, or even greater than or equal to 18, more particularly, greater than or equal to 19 and even more particularly, greater than or equal 20.

The modified zeolite prepared during step A) advantageously has a ratio of the volume of the small mesopores (Vs) to the volume of the large mesopores Vl, Vs/Vl, of greater than or equal to 1, especially greater than or equal to 1.20, or even greater than or equal to 1.60, more particularly, greater than or equal 1.80 and even more particularly, greater than or equal to 2.

The modified zeolite prepared during step A) has a total mesopore volume of greater than or equal to 0.20 ml/g, especially greater than or equal to 0.25 ml/g, in particular, greater than or equal to 0.35 ml/g, or even greater than or equal to 0.40 ml/g.

The modified zeolite prepared during step A) has a micropore volume of less than or equal to 0.20 ml/g, especially, less than or equal to 0.18 ml/g, in particular, less than or equal to 0.16 ml/g, or even less than or equal to 0.125 ml/g and more particularly, less than or equal to 0.10 ml/g.

The modified zeolite prepared during step A) has a total mesopore volume/micropore volume ratio of greater than or equal to 1, especially, greater than or equal to 1.5, in particular, greater than or equal to 3, or even greater than or equal to 3.5, more particularly, greater than or equal to 4, even more particularly, greater than or equal to 4.5 or even greater than or equal to 5.

The modified zeolite of the FAU framework type prepared during step A) may have an external surface area $S_{ext}$ of greater than or equal to 200 m²/g, especially, greater than or equal to 250 m²/g, in particular, greater than or equal to 300 m²/g, or even greater than or equal to 350 m²/g and more particularly, greater than or equal to 400 m2/g.

The acid site density, measured by TPD of ammonia (TPD $NH_3$), may be less than or equal to 0.5 mmol/g, especially less than or equal to 0.48 mmol/g, in particular, less than or equal to 0.46 mmol/g.

The modified zeolite of the FAU framework type prepared during step A) generally has the characteristic reflections of a faujasite structure on an X-ray diffraction pattern. These reflections correspond to the following interplane distances: d=13.965, 8.552, 7.293, 5.549, 4.655, 4.276, 3.824, 3.689, 3.232, 2.851, 2.793 and 2.578 Å (reference: Collection of simulated XRD powder patterns for zeolites, fifth revised edition, by M. M. J. Treacy and J. B. Higgins, Elsevier).

Optionally, after performing step A) and before performing step B) or C), a step of treatment with water vapour at a temperature from 250 to 450° C. for 2 to 6 hours is performed. This so-called steaming may help to repair/hydrolyse the bonds with aluminium that may have been broken during the alkaline treatment.

Step B)

Usually, the shaping envisaged in step B) is shaping by extrusion.

This extrusion may then be performed by:
(i) mixing the zeolite with at least one binder,
(ii) making a paste by adding to the mixture an aqueous suspension comprising at least one binder, and optionally, at least one agent chosen from the family of flocculants, peptizers or plasticizers,
(iii) extrusion of the paste obtained and chopping so as to obtain extrudates of given shape and length,
(iv) drying the extrudates, and
(v) calcination of the dried extrudates.

Usually, during step (i), the zeolite and the binder are mixed together in the presence of additives, for example polyglycols, such as glycerol, graphite or alternatively, cellulose ethers, for example Tylose®, or mixtures of one or more of these compounds.

When the binder contains alumina, the mixture of zeolite and binder may be prepared in an acidic solution, for example, an acidic aqueous solution, the acid then acting as peptizer.

The acid used may be an inorganic acid, such as nitric acid, or an organic acid.

The binder(s) used during the step B) or step (i) may be chosen from the group consisting of alumina, silica, silica-alumina, magnesia and titania or mixtures of one or more of these compounds.

Alternatively, the binder used during the step B) or step (i) may be titania or its mixture with one of the above mentioned compounds.

The mixture of step B) or i) advantageously comprises from 10% to 90% by weight of binder relatively to the total weight of the mixture, preferentially form 20% to 80%, more preferentially from 30% to 80%.

The extrusion process also includes, after the step i), a step ii) of making a paste by adding to the mixture an aqueous solution comprising at least one binder by any known means. Optionally, the aqueous solution may also comprise at least one agent chosen from the family of flocculants, peptizers or plasticisers.

This step is followed by a step (iii) of extrusion of the paste obtained and chopping so as to obtain extrudates of given shape and length, performed by any known means.

The drying step (iv) is performed so as to remove substantially all the water present in the extrudates, for example, at a temperature above 60° C., for example, from 80 to 200° C., for 1 to 30 hours depending on the temperature. This drying may be performed, for example, for 1 to 16 hours at 110° C. The drying may be accelerated by evacuation or by flowing air or nitrogen.

Usually, the calcination performed during the steps B) or (v) is performed at a temperature from 400 to 700° C., preferably, from 550 to 650° C., for example, at 600° C., for a period of 1 to 20 hours, preferably, from 1 to 15 hours, for example, from 1 to 10 hours.

Usually, step iv) directly follows step iii) without intermediate cooling.

Step C)

The process for preparing the industrial catalyst according to the invention comprises a step of impregnation of the shaped zeolite with at least one compound of a catalytic metal chosen from the metals of group VIIIB and/or of group VIB, in an acidic medium, provided that at least one compound is soluble within said acidic medium and wherein the acid acts as a complexing or a chelating agent of at least one compound of the catalytic metal taken from group VIIIB and/or from group VIB.

This impregnation is preferably followed by a calcination.

More generally, the process for preparing the industrial catalyst according to the invention comprises a step of introduction into the shaped zeolite of at least one catalytic metal chosen from group VIIIB and/or from group VIB with at least one compound of a catalytic metal chosen from the metals of group VIIIB and/or of group VIB, in an acidic medium, provided the at least one compound is at least partly soluble within said acidic medium, said introduction being followed by a calcination.

Said introduction may for example be performed by impregnation or ion exchange, preferably by impregnation.

Preferably, said acidic medium contains at least one acid which is a complexing or a chelating agent of the at least one compound of the catalytic metal taken from group VIIIB and/or from group VIB.

Especially, any compound of the catalytic metal taken from group VIIIB and/or from group VIB will be complexed or chelated by an acid contained in the acidic medium.

The acidic medium contains at least one acid, or a combination of acids, chosen from inorganic or organic acids.

Said acidic medium may contain at least one inorganic acid selected from the group of phosphorus-containing acids.

In one embodiment, inorganic acids acting as complexing agent of at least one compound of the catalytic metal taken from group VIIIB and/or from group VIB include $H_3PO_4$, $(NH_4)H_2PO_4$, $(NH_4)_2HPO_4$, $H_2PHO_3$, $H_2P_2H_2O_5$, and $H_{(n+2)}P_nO_{(3n+1)}$. Within the group of inorganic acids, the phosphorus-containing acids are preferred, since phosphorus in itself can positively influence the activity of a hydroprocessing catalyst. $H_3PO_4$ is particularly preferred.

In another embodiment, the acid is an organic compound containing oxygen or nitrogen.

This organic compound may contain at least one carboxylic functional group. It can additionally contain at least one functional group selected from carboxylic, hydroxyamic, hydroxyl, keto, amino, amido, imino, epoxy and thio. Non-limiting examples of organic complexing acid agents suitable for use herein include pyruvic acid, levulinic acid, acetic acid, 2-ketogulonic acid, keto-gluconic acid, thioglycolic acid, 4-acetylbutyric acid, 1,3-acetonedicarboxylic acid, 3-oxo propanoic acid, 4-oxo butanoic acid, 2,3-diformyl succinic acid, citric acid, 5-oxo pentanoic acid, 4-oxo pentanoic acid, formic acid, propionic acid, butyric acid, valeric acid, caproic acid, enantic acid, caprylic acid, pelargonic acid, capric acid, undecylic acid, lauric acid, tridecylic acid, benzoic acid, salicylic acid, glutaric acid, adipic acid, pimelic acid, azelaic acid, phtalic acid, isophtalic acid, lactic acid, ethyl glyoxylate, glycolic acid, glucose, glycine, oxamic acid, glyoxylic acid, EDTA (ethylenediaminetetraacetic acid), nitrilotriacetic acid, N-methylaminodiacetic acid, iminodiacetic acid, diglycolic acid, malic acid, gluconic acid, acetylacetone, tartaric acid, aconitic acid, suberic acid, tricarballylic acid, malonic acid, succinic acid and glycolic acid. Preferred organic acids are citric acid, thioglycolic acid, maleic acid, nitriloacetic acid, oxalacetic acid, and glycolic acid. Citric acid is particularly preferred.

Optionally, the organic acid can be used alone or in a combination.

The acidic medium may contain various solvents, for example water. The concentration of the inorganic or the organic acid or their mixture in a solvent may be in the range from 0.2 to 5 M, especially, from 0.3 to 3 M, particularly, from 0.5 to 2 M.

The elements of groups VIB and/or VIIIB, and optionally those that are selected from among phosphorus, boron, silicon and optionally the elements of groups VIIA, VB, and VIIB are then optionally introduced by any methods that are known to one skilled in the art after the shaping and before or after the calcination of the precursor or the catalyst.

The hydrogenating element can be introduced at any stage of the preparation, preferably during the mixing, or very preferably after shaping. The shaping is followed by a calcination, and the hydrogenating element can also be introduced before or after this calcination. The preparation generally ends by a calcination at a temperature of 250 to 700° C., preferably, from 450 to 650° C., for example, at 500° C. for a period of 1 to 10 hours, preferably, from 1 to 5 hours, for example, 3 hours.

In a preferred way, the substrate is impregnated by an aqueous solution. The impregnation of the substrate is preferably carried out by the so-called "dry" impregnation method that is well known to one skilled in the art. The impregnation can be carried out in a single stage by a solution that contains all of the constituent elements of the final catalyst.

The catalyst of this invention can therefore contain at least one element of group VIIIB, such as iron, cobalt, nickel, ruthenium, rhodium, palladium, osmium, iridium or platinum. Among the metals of group VIIIB, it is preferred to use a metal that is selected from the group that is formed by iron, cobalt, nickel and ruthenium. The catalyst according to the invention can also contain at least one element of group VIB, preferably tungsten and molybdenum. More preferably, the metals are selected among nickel, cobalt, molybdenum, tungsten, platinum, palladium, ruthenium or their combination.

In an advantageous manner, the following metal combinations are used: nickel-molybdenum, cobalt-molybdenum, nickel-tungsten, cobalt-tungsten; the preferred combinations are: nickel-molybdenum, cobalt-molybdenum, nickel-tungsten and cobalt-tungsten. It is also possible to use three-metal combinations, for example, nickel-cobalt-molybdenum and nickel-cobalt-tungsten. In an advantageous manner, the following metal combinations are used: nickel-molybdenum, cobalt-molybdenum, nickel-tungsten, cobalt-tungsten, whereby the preferred combinations are: nickel-molybdenum and cobalt-molybdenum. The metal from group VIIIB is preferably nickel and/or cobalt, and the metal from group VIB is preferably molybdenum and/or tungsten.

The following elements: boron and/or silicon and/or phosphorus and optionally (the) element(s) that are selected in group(s) VIIA, VIIB and VB can be introduced into the catalyst at any stage of the preparation and according to any technique that is known to one skilled in the art.

The promoter element that is selected from the group that is formed by silicon, boron and phosphorus, and the element that is selected from among the halide ions of group VIIA as well as the elements of groups VIIB and VB can be introduced by one or more impregnation operations with excess solution on the calcined precursor.

Other impregnation sequences can be used to obtain the catalyst according to the invention.

It is possible, for example, to impregnate the precursor with a solution that contains one of the promoter elements (P, B, Si), to dry, to calcine and then to impregnate the solid that is obtained with the solution that contains another promoter element, to dry, to calcine. It is also possible to impregnate the precursor with a solution that contains two of the promoter elements, to dry, to calcine and then to impregnate the solid that is obtained with the solution that contains another promoter element, to dry, and to initiate a final calcination.

In the case where the elements are introduced into several impregnations of corresponding precursor salts, an intermediate calcination stage of the catalyst should be carried out at a temperature of, for example and preferably, between 250 and 600° C.

The impregnation may be performed by using various solvents, preferably water, in the presence of an at least one acid, such as citric, acetic, and/or phosphoric-acid, at temperatures from 10 to 100° C. and at acidic to neutral pH. The preferred pH range is between 1 and 3.

Advantageously, the catalyst contains from 0.1% to 20% by weight of a metal from group VIIIB, more preferably from 0.1% to 10% by weight of a metal from group VIIIB, for example, nickel and/or cobalt, and from 1% to 30% by weight of a metal from group VIB, more preferably from 1% to 25% by weight of a metal from group VIB, for example, molybdenum.

By implementing the steps A), B), C) of the present invention, an industrial hydroconversion catalyst with preserved crystallinity, microporosity and pore size distribution can be obtained. The crystallinity and the microporosity of the final catalyst are then between 60 and 130% of the crystallinity and the microporosity of the extruded material before the impregnation with metal compounds.

Another aspect of the invention concerns a process for the hydroconversion of petroleum or of heavy residues, especially, a hydroconversion process, for example, hydrocracking or hydroisomerization, in which the feedstock to be treated is placed in contact with a catalyst according to the invention, for example, prepared according to the process of the invention.

Particularly, another aspect of the invention concerns the use of the catalyst obtained according to this invention in a hydroconversion process, in which the hydrocarbon feedstock is chosen from the group of light cycle oil, atmospheric distillates, vacuum distillates, such as vacuum gas-oil, feeds from aromatic extraction units, from solvent dewaxing of base lubricating oils, distillates derived from processes of desulphurisation, deasphalted oils, vegetable or animal oils, oils issued from algae or from bacteria, alone or in mixture.

Another aspect of the invention concerns a process for the hydroconversion of heavier hydrocarbon feedstock, for example, hydrocracking or hydroisomerization, in which the feedstock to be treated is placed in contact with a catalyst according to the invention, for example, prepared according to the process of the invention. Particularly, another aspect of the invention concerns use of the catalyst obtained according to this invention in a hydrocracking process.

Characterization Methods

The methods used to perform the measurements of the various characteristics are generally the standard techniques. More particularly, the following techniques were used in the context of this invention:

i) the chemical composition, in particular, the bulk Si/Al atomic ratio and the metal content, was determined by X-ray fluorescence spectroscopy;

ii) the structure of the zeolite was defined by X-ray diffraction (XRD). XRD was conducted on a Bruker D8 Discover diffractometer in the range between 5 to 70° with a Cu $K_{\alpha 1}$ radiation using a step-size of 0.02° and time/step of 1 s. The relative crystallinity of the samples was determined by background subtraction method;

iii) the nitrogen adsorption and desorption measurements were performed at the temperature of liquid nitrogen on a Micrometrics Tristar 3000 machine. Before each measurement, the samples were degassed under nitrogen at 300° C. for 840 minutes. The textural properties, defined by the external surface area ($S_{ext}$), the micropore volume ($V_{micro}$) and the mesopore volume ($V_{meso}$), were identified by volumetry with nitrogen using adsorption isotherms recorded at 77 K by applying the state-of-the-art methods [Barett, E. P.; Joyner, L. G.; Halenda, P. P. *J. Am. Chem. Soc.* 1951, 73, 373-380. Rouquerol, F.; Rouquerol, J.; Sing, K. *Adsorption by powders and porous solids*; Academic Press: San Diego, 1999]. The BET method [S. Brunauer, P. H. Emmett and E. Teller, *J. Am. Chem. Soc.*, 1938, 60, 309] was used to calculate the specific surface area. The external specific surface area and the specific pore volume were determined by the t-plot method, an empirical semi-quantitative method based on the comparison of the isotherm adsorption data of a porous sample and a non-porous sample of identical chemical composition and surface nature [K. S. W. Sing, Chem. and Ind., (1968) 1520]; the statistical thickness was calculated by means of the Harkins-Jura formula. The t-plot method is based on the comparison of the isotherm adsorption data for a porous sample and for a non-porous sample of identical chemical composition and surface nature;

iv) the electron tomography studies were performed on an electron transmission microscope Tecnai 20 at a voltage of 200 kV. The series of images were acquired under brilliant field image conditions for an angular tilt range from −75 to 75° and with an inclination increment of 1° for a magnification of 19 000 or 29 000. Three-dimensional reconstructions were calculated from the inclination series acquired, using IMOD software, v) the acidity of the catalysts was established by programmed thermo-desorption of ammonia (TPD $NH_3$) between 100 and 650° C. [Niwa, M.; Iwamoto, M.; Segawa, K. B. *Chem. Soc. Jpn.* 1986, 59] by monitoring the desorbed ammonia by conductivity;

DESCRIPTION OF THE FIGURES

The invention is now described with reference to the attached non-limiting drawings, in which.

EXAMPLES

Zeolite with trimodal porosity (HYA) was prepared according to the procedure described in WO 2010/07297.

Example 1

Preparation of a Modified Zeolite Y with Trimodal Porosity (HYA)

Commercially available zeolite Y (CBV760, Zeolyst Int.), referred to as HY30, is subjected to the following alkaline treatment:

HY30 (200 g) is placed in contact with an aqueous 0.05 M NaOH solution (2500 ml) for 15 minutes at room temperature and under stirring, the resulting product is filtered off and washed with water, the filtered product is dried for 12 hours at 80° C., aqueous 0.20 M $NH_4NO_3$ solution (2500 ml) is added to the dry product, and the whole is left for 5 hours at room temperature under stirring. This manipulation is performed trice.

the product obtained is washed with water, the product is then calcined at 500° C. for 4 hours (temperature gradient of 1° C./minute) in a stream of air.

The sample HYA is recovered.

Figure 1:
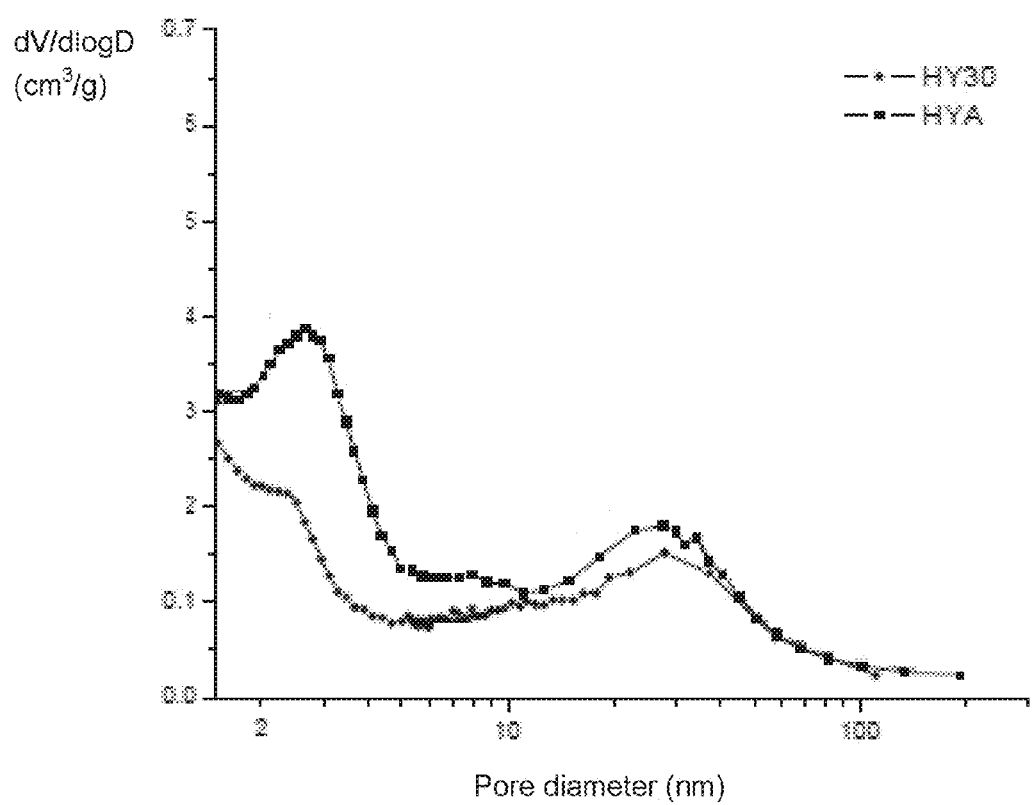
FIG. 1 represents the pore size distribution of the parent zeolite CBV760 (HY30) and the zeolite with trimodal porosity (HYA)

The characteristics of the samples HY30 and HYA are given in Table 1 and graphically represented in FIGS. 1 and 2.

Characterization of the Samples HY30 and HYA
Nitrogen Sorption

TABLE 1

Results of nitrogen physisorption for HY30 and HYA

| | | Sample | |
|---|---|---|---|
| | | HY30 | HYA |
| $S_{ext+meso}{}^a$ | m²/g | 213 | 339 |
| $V_{micro}{}^b$ | ml/g | 0.21 | 0.16 |
| $V_{meso}{}^c$ | ml/g | 0.16 | 0.25 |
| $V_{small\ meso}{}^d$ | ml/g | 0.07 | 0.14 |
| $V_{large\ meso}{}^e$ | ml/g | 0.09 | 0.11 |
| $V_{macro}{}^f$ | ml/g | 0.02 | 0.02 |
| $V_{tot}{}^g$ | ml/g | 0.45 | 0.51 |
| Pore diameter[h] | "small" | — | 2.7 |
| (nm) | "large" | 28 | 27 |

[a] mesopore surface area and external surface area calculated from the t-plot;
[b] micropore volume obtained by t-plot;
[c] mesopore volume obtained by integration of the dV/dD BJH adsorption curve for the pores 2 to 50 nm in diameter;
[d] volume of the small mesopores obtained by integration of the BJH dV/dD adsorption curve for the pores 2 to 8 nm in diameter;
[e] volume of the large mesopores obtained by integration of the BJH dV/dD adsorption curve for the pores 8 to 50 nm in diameter;
[f] macropore volume obtained by integration of the BJH dV/dD adsorption curve for the pores greater than 50 nm in diameter;
[g] volume adsorbed at $p/p_o = 0.99$;
[h] pore size distribution obtained from the BJH dV/dlogD adsorption curve.

The development of mesoporosity is confirmed by a BJH (Barret-Joyner-Halenda) analysis of the pore size distribution. The pore size distributions, derived from the adsorption part of the isotherm, are represented in FIG. 1. As shown in FIG. 1, the BJH adsorption clearly shows two distinct regions of pores:

a region of "small mesopores" centred at 3 nm
a region of "large mesopores" centred at 30 nm.

From the sample HY30 (no alkaline treatment) to HYA (alkaline treatment), the intensity of the peak corresponding to the small mesopores increases significantly, whereas the intensity of the peak corresponding to the large mesopores shows only a small increase coupled with weak broadening.

This shape of the BJH adsorption curves shows that the alkaline treatment of HY30 essentially induces the formation of small mesopores, whereas an increase in the volume of the large mesopores is less pronounced. Furthermore, the dimensions of the two types of mesopores do not appear to be dependent on the conditions of the alkaline treatment.

Table 1 shows the characteristics of HY30 and HYA. Notably, the corresponding volumes of the small and large mesopores are derived from the integration of the BJH adsorption part for a chosen range of diameters.

Electron Tomography (3D-TEM)

In contrast to conventional TEM microscopy, electron tomography allows better observation of the internal structure of the complex network of pores of the studied samples. In order to confirm the presence of the trimodal porosity demonstrated by the nitrogen sorption, the samples were subjected to an analysis by 3D-TEM, and the 3-dimensional (3D) reconstructions of the chosen particles were obtained.

Figure 2A:
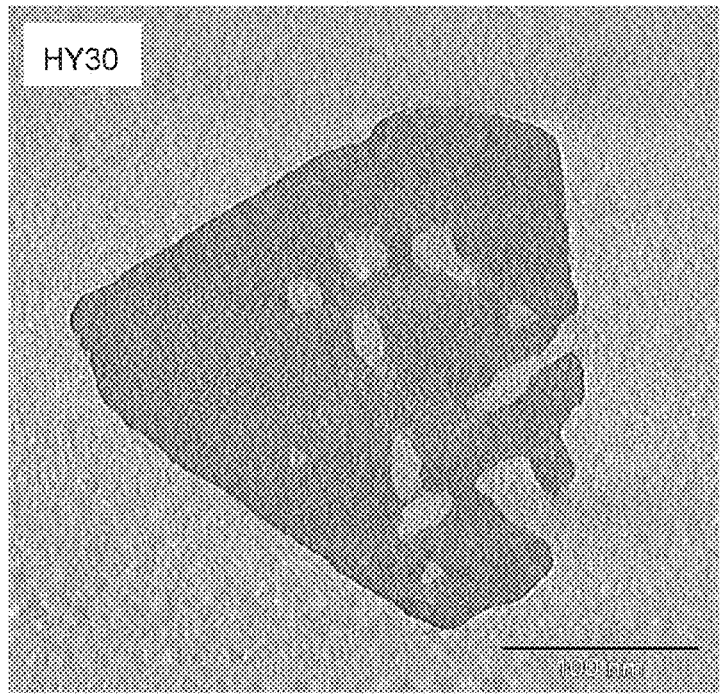
FIGS. 2a and b show electron tomographs of the parent zeolite CBV760 (HY30) and the zeolite with trimodal porosity (HYA)
Figure 2B:
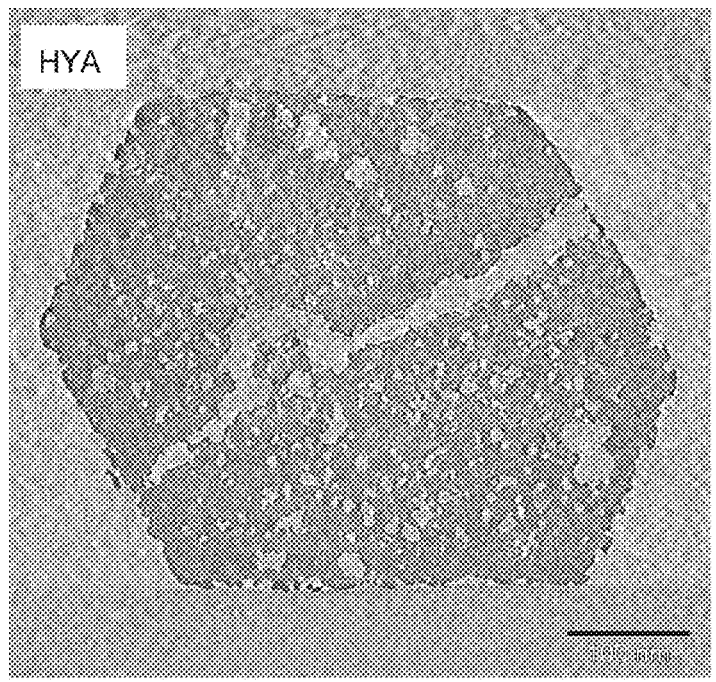

FIGS. 2a and 2b represent a section by 3D reconstruction of each of the three samples. Since the slices observed have a thickness of between 0.5 and 0.8 nm, they are not affected by the overlap characteristics as it is the case for conventional TEM micrographs.

The lightest regions correspond to the pores, and the dark regions represent the solid matter.

FIG. 2a represents a cross section of the sample HY30, 0.82 nm thick. The vapour and acid treatment led to creation of large mesopores in the form of channels and spheres of a broad diameter range, as shown by nitrogen sorption. The channel-shaped mesopores intersect and penetrate the particle from the outside inwards. The presence of isolated cavities is also confirmed. Although the nitrogen sorption shows that small mesopores are present, and their volume is virtually identical to that of the large mesopores, those appear to be absent.

FIG. 2b represents a cross section of 0.82 nm thickness of the sample HYA that has undergone a mild alkaline treatment. A new series of small mesopores has appeared, and the walls of the mesopores in the form of channels and cavities are more irregular. The formation of small mesopores and their diameter (2-5 nm) can be measured with great precision and is in accordance with the results obtained by nitrogen sorption. Furthermore, the small mesopores appear to be uniformly distributed over the entire volume of the particle and are interconnected.

The various characterization techniques demonstrate the particular mesoporous structure of the modified zeolites Y.

The vapour treatment followed by an acid treatment (HY30) leads essentially to the generation of mesopores of about 30 nm, having a shape of channels and cavities.

An additional alkaline treatment leads to the formation of a new network of small mesopores. The zeolites modified by the alkaline treatment and described in WO 2010/072 976 have a trimodal pore system, containing micropores, small mesopores and large mesopores.

Without wishing to be bound by this theory, it appears from the 3D-TEM analysis that these various networks of micropores and mesopores, and in particular, the new pores formed (network of small mesopores), are interconnected (the mesopore networks being interconnected with each other and via the micropores).

Example 2

Shaping of HYA

The zeolite with trimodal porosity HYA was shaped by extrusion, followed by a calcination step.

The zeolite powder was mixed with a binder, alumina (Condea SB, 75% $Al_2O_3$), in an HYA/binder ratio of 80/20% by weight.

Before extrusion and mixing with a binder, the zeolite powder HYA underwent a mild water vapour treatment ("steaming") for 4 hours at 300° C.-500° C. once the final temperature was reached at a heating rate of 1-3° C./min starting from room temperature so as to repair/hydrolyse the aluminium bonds that may have been broken during the alkaline treatment.

The extrusion process used is described below in detail:
Alumina Condea, is mixed with an aqueous solution containing 2.1% nitric acid (0.59 ml per 1 g dry alumina) and then mixed during several minutes in a Z-arm mixer (Aoustin MX2)
The fourfold amount (by weight) of HYA, based on the amount of the dry alumina, is added to the mixture. The mixture is mixed for 1 hour
Then 2.5 wt % flocculant (Optimer® 9779, Nalco) and 7.5 wt % of Tylose®(Hoechst) are added to the mixture, whereas the percentages are based on the weight of dry alumina
The mixing of the paste is continued for 1 hour
At the end of this mixing, the paste is passed through a die having cylinder orifices with an inscribed diameter of 2.5 mm using an Aoustin MXE extruder
The extrudates are then dried overnight at 110° C. and calcined at 600° C. for 10 hours The extrudates obtained had a cylindrical shape and were about 7 mm long and 2 mm in diameter.

The extruded material was named Extr-HYA.

The extrudates (Extr-HYA) then underwent a step of impregnation with metallic compounds, followed by calcination, as specified hereinbelow. The impregnation was performed via incipient wetness impregnation, a method described above.

Example 3

Impregnation of Extr-HYA with Metals in the Presence of Ethylene Diamine

The preparation method used in the tests is as follows: 200 g of Extr-HYA extrudates were impregnated with 200 ml of aqueous solution containing 34.5 g of $Ni(NO_3)_2.6H_2O$, 54.3 g of $(NH_4)_6Mo_7O_{24}.4H_2O$ and ethylene diamine in a molar fourfold to Ni. These amounts correspond to a target content of 3.5% by weight of NiO and 17.5% by weight of $MoO_3$. The pH of the solution was around 9.

The impregnated Extr-HYA extrudates were then dried at 110° C. for 16 hours and calcined at 500° C. (3° C./minute) for 3 hours under a stream of air (50 Nl/hour), with observation of a colour change from purple to grey.

These extrudates thus obtained from Extr-HYA are then ready to be used industrially and are herein below referred to as Cat-HYA.

Example 4

Impregnation of Extr-HYA with Metals in Presence of Citric Acid

The operating method used in the tests is as follows: 50 g of Extr-HYA extrudates were impregnated with 45 g of 1

M aqueous solution of citric acid containing 8.81 g of Ni(NO$_3$)$_2$.6H$_2$O, 13.76 g of (NH$_4$)$_6$Mo$_7$O$_{24}$.4H$_2$O and additional 7 g of citric acid monohydrate added later directly to the suspension. These amounts correspond to a target content of 3.58% by weight of NiO and 17.63% by weight of MoO$_3$. The pH of the solution was around 1.

The impregnated Extr-HYA extrudates were then dried at 110° C. for 48 hours and calcined at 500° C. (3° C./min) for 3 hours under a stream of air (50 NI/h).

These extrudates thus obtained from Extr-HYA are then ready to be used industrially and are herein below referred to as Cat-HYC.

Example 5

Impregnation of Extr-HYA with Metals in Presence of Phosphoric Acid

The operating method used in the tests is as follows: 50 g of Extr-HYA extrudates were impregnated with 45 g of 1 M aqueous solution of phosphoric acid containing 8.81 g of Ni(NO$_3$)$_2$.6H$_2$O and 13.76 g of (NH$_4$)$_6$Mo$_7$O$_{24}$.4H$_2$O. These amounts correspond to a target content of 3.58% by weight of NiO and 17.63% by weight of MoO$_3$. The pH of the solution was around 1.

The impregnated Extr-HYA extrudates were then dried at 110° C. for 48 hours and calcined at 500° C. (3° C./min) for 3 hours under a stream of air (50 NI/h).

These extrudates thus obtained from Extr-HYA are then ready to be used industrially and are herein below referred to as Cat-HYP.

Example 6

Characterization of the Shaped and Impregnated Catalysts

X-Ray Diffraction

The degree of crystallinity of the samples has been determined from the diffractograms by subtracting the background assigned to the amorphous part. Table 2 gives the degrees of crystallinity for the impregnated samples compared to the extruded material before impregnation. The degree of crystallinity is 20% for the HYA impregnated in presence of ethylene diamine, 45% for the impregnation in presence of citric acid and 68% for the impregnation in presence of phosphoric acid. Compared to the extruded material before the impregnation with the metal compounds, Extr-HYA, Cat-HYA has only 34% of the crystallinity, 37% of the BET surface area, 17% of the microporous volume and 57% of the total pore volume. In contrast, Cat-HYC preserves 76% of the crystallinity of Extr-HYA, 70% of the BET surface area, 75% of the micropore volume and 69% of the total pore volume. Cat-HYP shows even higher crystallinity compared to Extr-HYA, most probably due to the partial dissolution of the amorphous material contained in the zeolitic material during the impregnation with H$_3$PO$_4$. This hypotheses is fortified by the higher Si/Al bulk ratio of Cat-HYP compared to Cat-HYA and Cat-HYC.

TABLE 2

Characterization results of impregnated HYA

| | | Sample | | | |
|---|---|---|---|---|---|
| | | Extr-HYA | Cat-HYA | Cat-HYC | Cat-HYP |
| Crystallinity | % | 59 | 20 | 45 | 68 |
| Si/Al bulk | | 2.8 | 3.25 | 3.1 | 3.3 |
| $S_{BET}$[a] | m$^2$/g | 609 | 228 | 426 | 394 |
| $S_{ext}$[b] | m$^2$/g | 329 | 166 | 209 | 169 |
| $V_{micro}$[c] | ml/g | 0.12 | 0.02 | 0.09 | 0.09 |
| $V_{meso}$[d] | ml/g | 0.36 | 0.26 | 0.25 | 0.21 |
| $V_{tot}$[e] | ml/g | 0.54 | 0.31 | 0.37 | 0.32 |
| NH$_3$-TPD[f] | mmol/g | 0.398 | 1.2 | 1.2 | 0.9 |
| Ni | Wt % | — | 3.1 | 2.5 | 2.8 |
| Mo | Wt % | — | 9.0 | 9.8 | 10.3 |

[a]BET surface area;
[b]external surface area;
[c]micropore volume;
[d]mesopore volume;
[e]total pore volume;
[f]amount of desorbed NH$_3$ Nitrogen Physisorption Table 2 shows the nitrogen physisorption results for Extr-HYA, Cat-HYA, Cat-HYC and Cat-HYP. The BET specific surface area, the microporosity and the total pore volume are higher for the samples impregnated in the presence of an acid. The external surface area is also higher for Cat-HYC and Cat-HYP. The mesoporous volume is almost the same for all samples. This indicates the improved microporosity and maintained mesoporosity for the samples impregnated in the presence of an acid compared to the one impregnated in the presence of ethylene diamine.

Figure 3:
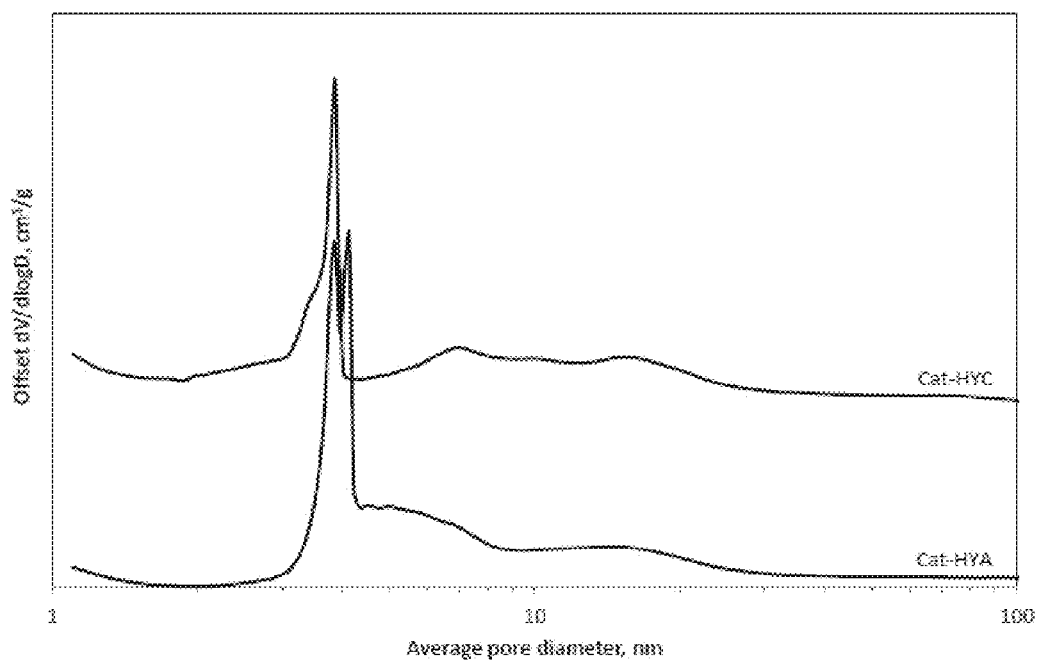
FIG. 3 shows the pore size distribution of the shaped HYA impregnated in presence of ethylene diamine (Cat-HYA), and in presence of citric acid (Cat-HYC) and in presence of phosphoric acid (Cat-HYP)

FIG. 3 shows the pore size distribution (PSD) of Cat-HYA, Cat-HYC and Cat-HYP. The peak in the PSD of Cat-HYA around 4 nm is an analytical artefact. The graphs are similar with the crucial difference that the PSDs of Cat-HYC and Cat-HYP show a shoulder with a maximum at 3.4 nm corresponding to small mesopores. These small mesopores were also present in the PSD of the zeolite compound with trimodal porosity. Therefore, the porous structure of the zeolite compound is better preserved for the catalysts impregnated in presence of an acid. In the PSD of Cat-HYP there is also a peak at 36.6 nm present.

Temperature-Programmed Desorption of NH$_3$ (NH$_3$-TPD)

The amount of Brønsted acid sites (BAS) was determined by temperature-programmed desorption of NH$_3$. Table 2 shows the overall acidity of Cat-HYA, Cat-HYC and Cat-HYP. For Cat-HYA and Cat-HYC it was 1.2 mmol/g; for Cat-HYP, 0.9 mmol/g.

Example 7

Catalysis—Hydrocrackinq of Vacuum Gas Oil (VGO)

Catalysts were tested in hydrocracking of VGO in an isothermal pilot plant, where two trains of two trickle bed reactors were operated in series. In the first reactors of each train, pretreatment of the VGO feed has been carried out, whereas in the second reactors, the effluent was hydrocracked.

The reactors were loaded with a total of 40 ml of catalyst into all four reactors.

The diluent to catalyst ratio was set to 1:1 for the pretreatment reactors. For hydrocracking reactors, the diluent to catalyst ratio was set to 1:2 for the top catalyst bed and 1:1 for the bottom catalyst bed. 65 mesh (or 0.210 mm) Silicon Carbide was used as the catalyst diluent.

All catalysts were sulphided in situ. The sulphiding medium for pretreatment reactors was a mixture of Straight Run Gas Oil (SRGO) and 4.0% w/w DMDS. The sulphiding feed for hydrocracking reactors, was a mixture of SRGO, 4.0% w/w DMDS and 1% TBA.

Table 3 gives the composition of the VGO and sulphiding feed.

TABLE 3

Properties of VGO and sulphiding feed (SRGO + DMDS + TBA)

| Feed Description | | VGO | SRGO + 4% DMDS + 1% TBA |
|---|---|---|---|
| Sulphur | ppm | 15040 | 37080 |
| Nitrogen | ppm | 1250 | 1896 |
| Density at 15° C. | g/ml | 0.9128 | 0.8609 |
| API | | 23.4 | 32.7 |
| Total aromatics | % wt | 44.95 | — |
| Mono-Aromatics | | 23.97 | — |
| Di-Aromatics | | 11.11 | — |
| Poli-Aomatics | | 9.87 | — |
| Hydrogen | % wt | 12.354 | — |
| Viscosity, 100° C. | cSts | 6.5165 | — |
| Basic Nitrogen | ppmwt | 432.1 | — |
| MCRT | % wt | 0.21 | — |
| Asphaltenes | % wt | 0.05 | — |
| Ni | ppm | 0.00 | — |
| V | ppm | 0.23 | — |
| Fe | ppm | 1.35 | — |

| Distillation | Ext Sim Dist D 7213 | Ext Sim Dist D 7213 |
|---|---|---|
| Fraction (% w/w) | | |
| IBP | 230.8 | — |
| 5 | 326.8 | |
| 10 | 356.4 | |
| 20 | 385.8 | |
| 30 | 403.2 | |
| 40 | 418.6 | |
| 50 | 432.6 | |
| 60 | 447.6 | |
| 70 | 465.0 | |
| 80 | 487.8 | |
| 90 | 515.0 | |
| 95 | 534.2 | |
| FBP | 572.2 | |

Pretreatment reactors were operated at 155 barg, LHSV of 2 and H$_2$/oil of 1000 NL/L. The temperature was adjusted between 390 and 393° C. in order to get a nitrogen slip of 13±2 ppm.

The operating conditions of the hydrocrackers were as follows:
Pressure: 155 bar
Temperature: 390-430° C.
LHSV: 2 h$^{-1}$
H$_2$/oil ratio: 1000 NL/L.

Figure 4:
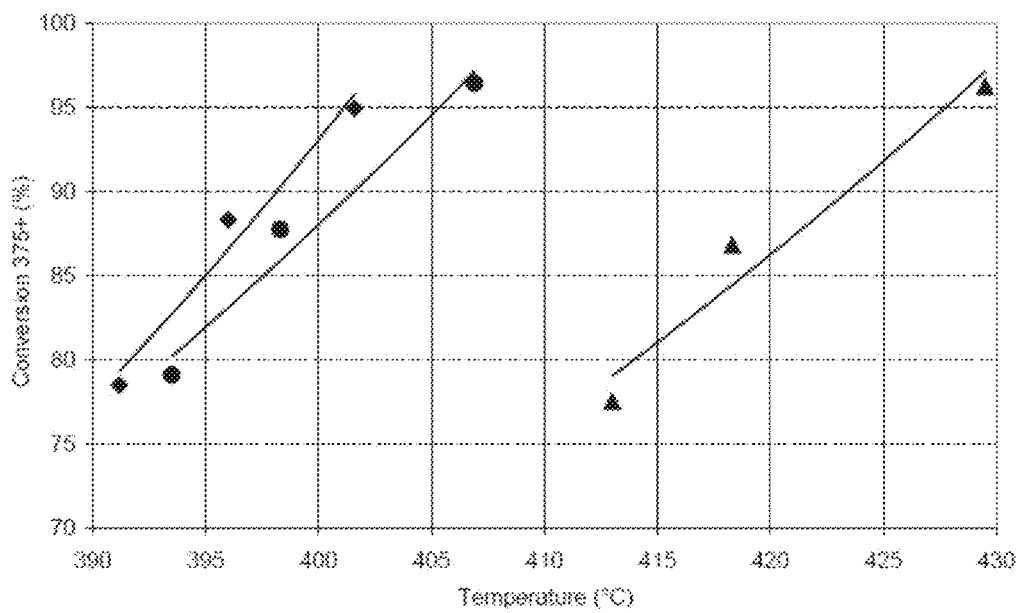
FIG. 4 shows the conversion vs. temperature in hydrocracking of VGO for the shaped HYA impregnated in presence of ethylene diamine (Cat-HYA, triangles), in presence of citric acid (Cat-HYC, squares) and in presence of phosphoric acid (Cat-HYP, circles).

The net 375+ conversion, the yields pattern and the hydrogen consumption are reported in Table 4 and in FIGS. 4 and 5.

Catalysts Cat-HYC and Cat-HYP are 20-22° C. more active than Cat-HYA, meaning that 20-22° C. less are required over these catalysts to reach a conversion of 80% (Table 4, FIG. 4). The yield of the fraction boiling between 145 and 375° C. is 5 wt % higher over Cat-HYC and 4 wt % lower over Cat-HYP. The hydrogen consumption is 13-16 NL/L higher over Cat-HYC and Cat-HYP than over Cat-HYA.

TABLE 4

Results of hydrocracking of VGO at 80% net conversion

| | | Sample | | |
|---|---|---|---|---|
| | | Cat-HYA | Cat-HYC | Cat-HYP |
| T$^a$ | ° C. | 414 | 392 | 394 |
| Yield(145-375° C.)$^b$ | wt % | 54 | 59 | 50 |
| H$_2$ consumption | NL/L | 245 | 258 | 261 |

$^a$Temperature to reach 80% conversion;
$^b$yield of the fraction boiling between 145 and 375° C.

The invention claimed is:

1. Process for preparing a hydroconversion catalyst based on a modified zeolite of the FAU framework type with preserved crystallinity and interconnected trimodal porosity, comprising the steps of:
A—preparation of a modified zeolite of the FAU framework type, whose intracrystalline structure presents at least one network of micropores, at least one network of small mesopores with a mean diameter of 2 to 5 nm and at least one network of large mesopores with a mean diameter of 10 to 50 nm; these various networks being interconnected with each other;
B—mixing the zeolite with a binder, shaping the mixture, and then calcining and obtaining a shaped zeolite;
C—impregnation of the shaped zeolite with at least one compound of a catalytic metal chosen from compounds of a metal from group VIIIB and/or from group VIB, in acidic medium, provided that at least one compound of a catalytic metal is soluble within said acidic medium and that the acid acts as a complexing or chelating agent for at least one compound of a catalytic metal, and obtaining a final catalyst exhibiting a crystallinity and a volume of micropores of from 60 to 130% of those of the shaped zeolite.

2. Process according to claim 1, wherein the acidic medium contains water as solvent.

3. Process according to claim 1, wherein the acid is an organic oxygen- or nitrogen-containing compound that contains at least one carboxylic functional group and at least one additional function group selected from carboxylic, hydroxyamic, hydroxyl, keto, amino, amido, imino, epoxy, and thio.

4. Process according to claim 1, wherein the acid is an inorganic acid selected from the group of phosphorus-containing acids.

5. Process according to claim 1, wherein the acid concentration is in the range from 0.2 to 5 M.

6. Process according to claim 1, wherein the metals are selected among nickel, cobalt, molybdenum, tungsten, platinum, palladium, ruthenium or their combination.

7. Process according to claim 1, wherein the catalyst contains from 0.1% to 20% by weight of a metal from group VIIIB and from 1% to 30% by weight of a metal from group VIB.

8. Process according to claim 1, wherein the metal from group VIIIB is nickel and/or cobalt, and the metal from group VIB is molybdenum and/or tungsten.

9. Process according to claim 1, wherein the binder is selected among alumina, silica, silica-alumina, magnesia and titania, or mixtures of one or more of these compounds.

10. Process according to claim 1, wherein the shaped zeolite is impregnated with elements of groups VIB and/or VIIIB, and at least one element selected from the group consisting of phosphorus, boron, silicon and elements of groups VIIA, VB, and VIIB.

11. Process according to claim 3, wherein the organic acid is citric acid, thioglycolic acid, or maleic acid.

12. Process according to claim 4, wherein the acid is phosphoric acid.

13. Process according to claim 5, wherein the acid concentration is in the range from 0.3 to 3 M.

14. Process according to claim 5, wherein the acid concentration is in the range from 0.5 to 2 M.

15. Process according to claim 7, wherein the catalyst contains from 0.1% to 10% by weight of a metal from group VIIIB, and from 1% to 25% by weight of a metal from group VIB.

16. A shaped catalyst containing a modified zeolite of the FAU framework type, whose intracrystalline structure presents at least one network of micropores, at least one network of small mesopores with a mean diameter of 2 to 5 nm and at least one network of large mesopores with a mean diameter of 10 to 50 nm, these various networks being interconnected with each other; at least one binder; and at least one compound of a catalytic metal chosen from group VIIIB and/or from group VIB metals, wherein the crystallinity and micropore volume of the shaped catalyst are 60 to 130% of the crystallinity and micropore volume respectively of a shaped zeolite containing the modified zeolite of the FAU framework type having a trimodal intracrystalline porosity and the binder prior to impregnation of the at least one compound of a catalytic metal, wherein the shaped catalyst is prepared by the process of claim 1.

17. The shaped catalyst according to claim 16, wherein its crystallinity is above 70 to 120% of the crystallinity of the shaped zeolite containing a modified zeolite of the FAU framework type having a trimodal intracrystalline porosity and a binder.

18. The shaped catalyst according to claim 16, wherein its microporous volume is 70 to 120% of the microporous volume of the shaped zeolithe containing a modified zeolite of the FAU framework type having a trimodal intracrystalline porosity and a binder.

19. A hydroconversion process comprising contacting a hydrocarbon feedstock with the shaped catalyst according to claim 16.

* * * * *